US006399038B2

(12) United States Patent
Ninane et al.

(10) Patent No.: US 6,399,038 B2
(45) Date of Patent: Jun. 4, 2002

(54) PROCESS FOR MAKING SODIUM CARBONATE

(75) Inventors: Léon Ninane; Claude Criado, both of Dombasle-sur-Meurthe (FR)

(73) Assignee: Solvay, S.A., Brussels (BE)

( * ) Notice: Subject to any disclaimer, the term of this patent is extended or adjusted under 35 U.S.C. 154(b) by 0 days.

(21) Appl. No.: 09/240,694

(22) Filed: Feb. 2, 1999

(30) Foreign Application Priority Data

Feb. 2, 1998 (BE) ............................................ 09800067

(51) Int. Cl.[7] .................................................. C01D 7/14
(52) U.S. Cl. ..................................... 423/421; 423/206.2
(58) Field of Search ............................... 423/421, 206.2

(56) References Cited

U.S. PATENT DOCUMENTS

| 3,425,795 A | | 2/1969 | Howard et al. ............. 423/421 |
| 5,911,959 A | * | 6/1999 | Wold et al. ............... 423/206.2 |

FOREIGN PATENT DOCUMENTS

| EP | 0073085 B1 | 3/1983 |
| WO | 94/27725 | 12/1994 |

OTHER PUBLICATIONS

"Particle Size Measurement" by Terence Allen Ph.D. Powder Technology Series, 1974. pp. 251–263. no month.

* cited by examiner

*Primary Examiner*—Stuart L. Hendrickson
(74) *Attorney, Agent, or Firm*—Venable; Marina V. Schneller

(57) ABSTRACT

Process for producing sodium carbonate, according to which a sodium sesquicarbonate ore is successively calcined and dispersed in an aqueous solution substantially saturated with hydrated sodium carbonate and the resulting aqueous suspension is subjected to an aging, at the end of which an aqueous mixture of a powder comprising hydrated sodium carbonate crystals is collected. During the aging, a fine particle size fraction is extracted from the aqueous suspension and removed.

13 Claims, 2 Drawing Sheets

PROCESS FOR MAKING SODIUM CARBONATE

FIELD OF THE INVENTION

The invention relates to a process for producing sodium carbonate.

It relates more particularly to a process for producing sodium carbonate from an ore comprising sodium sesquicarbonate.

BACKGROUND OF THE INVENTION

Trona ores, deposits of which exist particularly in the state of Wyoming in the United States, are used for the production of sodium carbonate. The usable matter in these ores is sodium sesquicarbonate, which is generally present in a quantity on the order of 80 to 95% by weight.

Various processes for enriching these ores and for extracting sodium carbonate from them have been proposed, which could be improved, particularly in the glass industry. In one known enrichment process (International Application WO 94/27725), the ore is subjected to several successive physical operations, including a grinding, a particle size fractionation into a fine size fraction and a coarse size fraction, and a densimetric, electrostatic or magnetic classification of the fine size fraction. In this known process, the purpose of grinding and the particle size classification is to enrich the ore (the fine size fraction being enriched with sodium sesquicarbonate, to the detriment of the coarse size fraction). In a variant of this known process, it is recommended that prior to the densimetric classification, the ore be subjected to a calcination in order to convert the sodium sesquicarbonate into anhydrous sodium carbonate. In this variant of the known process, the purpose of the calcination is essentially to facilitate the densimetric classification by increasing the difference between the specific gravity of the usable matter of the ore and that of the barren matter forming the gangue. It can be performed either before the grinding or after the particle size fractionation.

The known process just described has the disadvantage of generating large volumes of waste, containing non-negligible quantities of usable matter. Moreover, the quantity of usable matter lost in the waste increases with the degree of purity sought for the sodium carbonate to be produced. For this reason, this known process does not make it possible to produce sodium carbonate of high purity economically. The degree of purity of the sodium carbonate obtained rarely exceeds 98% by weight.

The process described in U.S. Pat. No. 3,425,795 eliminates this drawback. According to this known process, after having been finely ground, then calcined to convert the sodium sesquicarbonate into anhydrous sodium carbonate, the ore is dispersed in an aqueous solution, saturated with sodium carbonate monohydrate, the resulting aqueous suspension is subjected to an aging at a temperature of 65 to 108° C. (preferably 92 to 97° C.), and at the end of the aging, a mixture comprising sodium carbonate monohydrate crystals and insoluble compounds is collected, and the sodium carbonate monohydrate crystals are extracted from the mixture by means of a particle size fractionation. The sodium carbonate monohydrate crystals can then be heated above the temperature of 108° C. in order to convert the sodium carbonate monohydrate into anhydrous sodium carbonate. The known process just described makes it possible to obtain sodium carbonate with a purity higher than 99.5% by weight.

SUMMARY OF THE INVENTION

An improved process has now been found, which makes it possible to increase the purity of the sodium carbonate even further.

Consequently, the invention relates to a process for producing sodium carbonate according to which a sodium sesquicarbonate ore is successively calcined and dispersed in an aqueous solution substantially saturated with hydrated sodium carbonate, and the resulting aqueous suspension is subjected to an aging, at the end of which an aqueous mixture of a powder comprising hydrated sodium carbonate crystals is collected, the process being characterized in that during the aging, a fine size fraction is extracted from the aqueous suspension and removed.

In the process according to the invention, the sodium sesquicarbonate is a mineral with the general formula $Na_2CO_3 \cdot NaHCO_3 \cdot 2H_2O$. The source of the sodium sesquicarbonate ore is not critical. It could be, for example, a trona ore originating from the state of Wyoming in the United States, normally containing from 80 to 95% sodium sesquicarbonate by weight.

In the process according to the invention, the ore is calcined. Calcination is an operation that is well known in the art. It consists of subjecting the ore to a heat treatment under controlled conditions in order to break down the sodium sesquicarbonate and form anhydrous sodium carbonate. The heat treatment generally comprises a heating to a temperature higher than 100° C., preferably at least equal to 120° C., for example between 125 and 200° C. The technique used to perform the calcination of the ore is not critical. Advantageously, the technique described in the document WO 94/27725 may be used.

In the process according to the invention, the calcined ore is dispersed in an aqueous solution that is substantially saturated with hydrated sodium carbonate, and the aqueous suspension thus formed is subjected to an aging. During the aging, the anhydrous sodium carbonate of the calcined ore recrystallizes into hydrated sodium carbonate. The aging in this case must be performed under physicochemical conditions in which the hydrated sodium carbonate is stable, which conditions can be easily determined by one skilled in the art. The hydrated sodium carbonate that crystallizes can be sodium carbonate monohydrate, sodium carbonate heptahydrate or sodium carbonate decahydrate, depending on the physicochemical conditions used in the aging. For example, in the case where the hydrated sodium carbonate is sodium carbonate monohydrate (with the general formula $Na_2CO_3 \cdot H_2O$), the aging is performed at a temperature that is lower than the temperature of the transition of the sodium carbonate monohydrate into anhydrous sodium carbonate, this transition temperature being in the neighborhood of 108° C. at the normal atmospheric pressure. Temperatures between about 35 and 108° C. are generally suitable, and temperatures from 80 to 100° C. are particularly advantageous. Preferably, the aging should also be performed under suitable pressure and temperature conditions, in order to prevent an evaporation of the hydrated sodium carbonate solution.

The process according to the invention is based on a modification of the diameter of the sodium carbonate particles, by recrystallization into the hydrated state during the aging. More particularly, the process uses operating conditions for which the average diameter of the hydrated sodium carbonate crystals that are formed during the aging stage is larger than the diameter of the particles of the calcined ore. The average diameter of the hydrated sodium carbonate crystals is defined by the mathematical relation $$d = \Sigma n_i d_i / \Sigma n_i$$

in which d designates the average diameter and $n_i$ designates the gravimetric frequency of the crystals of diameter $d_i$. The diameters $d_i$ are, for example, measured by screening in accordance with the AFNOR standard. During the aging, the conditions created preferably promote the production of hydrated sodium carbonate crystals of coarse size and uniform morphology, having a particle size distribution that is not very wideranging. The process according to the invention normally requires an appropriate grinding of the calcined ore, possibly followed by a screening, in order to accentuate the difference between the size of the particles of the calcined ore and the size of the hydrated sodium carbonate crystals formed during the aging.

At the end of the aging, a mixture of a powder in suspension in an aqueous solution saturated with hydrated sodium carbonate is collected. The powder is essentially composed of hydrated sodium carbonate crystals and of normally insoluble materials of the gangue of the ore. The powder is subjected to a particle size fractionation. The purpose of the particle size fractionation is to divide the powder into at least two parts with two distinct particle sizes, one of which is enriched with hydrated sodium carbonate as compared to the other. In the process according to the invention, it is essential during the particle size fractionation of the mixture to maintain physicochemical conditions (especially a pressure and a temperature) that prevent a decomposition of the hydrated sodium carbonate crystals. The particle size fractionation can be performed by any appropriate means. A first means consists of extracting the powder from the mixture, drying it and then subjecting it to a screening. A second means, which is preferred, consists of subjecting the powder of the mixture to an elutriation. Elutriation is a well-known technique for particle size analysis (*Particle Size Measurement*, Terence Allen, Chapman and Hall, London 1974, pages 250–263). The elutriation is preferably performed wet. It is advantageous to select an elutriation of the levigation type.

According to the invention, during the aging, a fine particle size class is extracted from the aqueous suspension and is removed. The term fine particle size class is intended to designate a set of solid particles of the aqueous suspension whose diameter is smaller than the average diameter of the hydrated sodium carbonate crystals obtained at the end of the aging.

The extraction of the fine particle size class from the aqueous suspension can be performed in any appropriate particle size classifier. According to one particular embodiment of the process according to the invention, a fraction of the aqueous suspension in the process of being aged is periodically or continuously sampled, said aqueous suspension fraction is processed in a particle size classifier in which the solid part of said aqueous fraction is divided into a fine particle size class and a coarse particle size class, the fine particle size class is removed, and said aqueous suspension fraction (freed of its fine particle size class) is recycled into the aqueous suspension in the process of being aged. The particle size classifier can be, for example, the type that screens through standardized screens. It is preferred to use a particle size separator that uses elutriation, a wet elutriation of the levigation type being preferred. In the particular embodiment of the process according to the invention just described, the purity of the sodium carbonate obtained at the end of the process increases in proportion to the relative size of the fraction of the aqueous suspension that is extracted and subjected to the particle size classification. In practice, it is advantageous for this fraction to be at least equal to 1:1 (preferably 5:1) per 1 kg of calcined ore used, and not to exceed 500:1 (preferably 25:1) per 1 kg of said calcined ore. The purity of the sodium carbonate also depends on the cutoff diameter of the two particle size classes. By definition, the cutoff diameter is the aperture diameter of the standardized particle size measuring screen (for example according to the AFNOR standard), which the entire fine particle size class passes through and which stops the entire coarse particle size class. The cutoff diameter must be smaller than the average diameter of the hydrated sodium carbonate crystals in the aqueous mixture obtained at the end of the aging. All else being equal, the larger the above-mentioned cutoff diameter, the purer the sodium carbonate obtained at the end of the process according to the invention. On the other hand, all else being equal, the volume of the fine particle size class (and consequently the loss of usable matter) increases with the cutoff diameter. The selection of the optimum cutoff diameter is therefore the result of a compromise between the search for a maximum purity of the sodium carbonate produced and for a minimum loss of usable matter from the ore.

In the process according to the invention, the sodium sesquicarbonate ore may possibly undergo a physical enriching pretreatment, before being dispersed in the aqueous solution of hydrated sodium carbonate. This physical enriching pretreatment may specifically include a densimetric, electrostatic and/or magnetic classification. It can be performed either before or after the calcination. It is preferable to perform it after the calcination. Densimetric, electrostatic and magnetic classifications are well known physical methods for enriching ores. Information about these three methods is specifically available in the document WO 94/27725.

At the end of the process according to the invention, the hydrated sodium carbonate is collected. It can be used as is. Preferably, it is converted into anhydrous sodium carbonate, by heating it to a temperature higher than the temperature of the transition of the sodium carbonate monohydrate into anhydrous sodium carbonate.

The process according to the invention has an especially recommended application to the production of sodium carbonate from trona ores, particularly ores comprising from 80 to 95% sodium sesquicarbonate by weight, deposits of which are found in the state of Wyoming in the United States.

BRIEF DESCRIPTION OF THE DRAWINGS

Certain characteristics and details of the invention will emerge from the following description of the attached drawings.

In these figures, the same references designate identical elements.

DETAILED DESCRIPTION OF THE INVENTION

Figure 1:
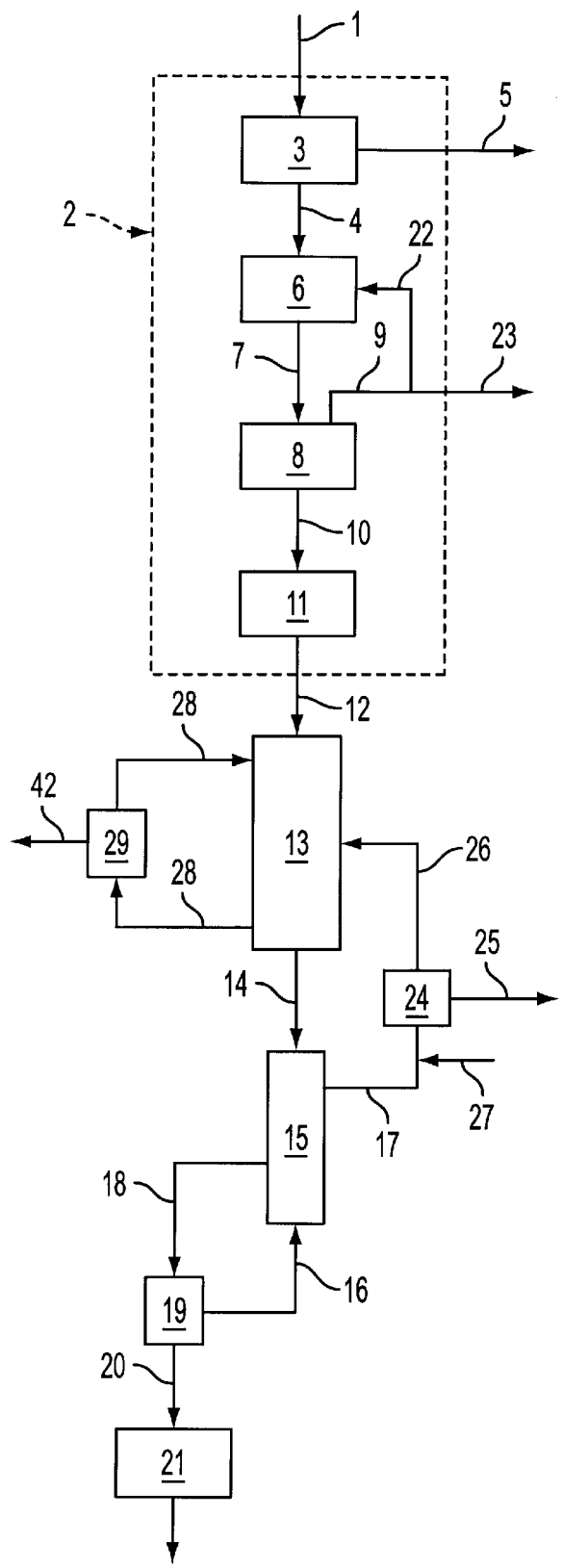
FIG. 1 is the diagram of an installation for implementing a particular embodiment of the process according to the invention.

In the installation diagraommed in FIG. 1, a trona ore 1 is first subjected to a physical enriching treatment in a set of devices, designated as a whole by the general reference number 2. During this physical enriching treatment, the ore 1 is first subjected to an electrostatic classification 3, in which it is divided into a usable fraction 4 and a barren fraction 5 that is removed from the process. The usable fraction 4 is sent to a grinder 6, in which it is ground to an appropriate particle size, advantageously on the order of 50 to 200 $\mu$m. The ground product 7 collected from the grinder 6 is processed through a calibrated screen 8, where it is divided into two distinct size fractions 9 and 10. For example, a screen 8 having an opening diameter of 100 μm is selected. The coarse size fraction 9 (the waste from the screen 8) is divided into a part 22 that is recycled into the grinder 6 and a part 23 that is removed from the process. The quantity of the recycled part 22 depends on its residual sodium sesquicarbonate content. In a variant, the fraction 9 can be completely recycled into the grinder 6, or conversely, completely removed from the process.

The fine size fraction 10 (passed through the screen 8) is sent into a kiln 11, where it is heated to a sufficient temperature to break down the sodium sesquicarbonate into anhydrous sodium carbonate. In the size fraction 12 collected from the kiln 11, the sodium carbonate is essentially in the anhydrous sodium carbonate state.

The fine size fraction of anhydrous sodium carbonate 12 is introduced into a crystallizer 13 containing an aqueous solution saturated with sodium carbonate monohydrate. The aqueous suspension thus obtained is subjected to an aging in the crystallizer 13, where pressure and temperature conditions prevail for which the anhydrous sodium carbonate is thermodynamically unstable and the sodium carbonate monohydrate is stable. During its time in the crystallizer 13, the anhydrous sodium carbonate of the fraction 12 recrystallizes into the sodium carbonate monohydrate state. The aging is finished when almost all of the anhydrous sodium carbonate has recrystallized into sodium carbonate monohydrate. At the end of the aging, an aqueous mixture 14 of a powder comprising crystals of sodium carbonate monohydrate and particles of barren matter from the gangue of the ore is collected from the crystallizer 13. As a result of the choice of the diameter of the screen 8 and the operating conditions in the crystallizer 13, the sodium carbonate monohydrate crystals in the mixture have an average particle diameter larger than the diameter of the particles of the barren matter.

According to the invention, a fraction 28 of the aqueous suspension is continuously extracted from the crystallizer 13 and it is sent to a particle size classifier 29. In the particle size classifier 29, the solid matter of the aqueous suspension is divided into two distinct particle size classes (a fine particle size class and a coarse particle size class). The particle size classifier 29 is adjusted so that the cutoff diameter of the two particle size classes is smaller than the average diameter of the sodium carbonate monohydrate crystals of the mixture 14 and at least equal to (preferably larger than) the aperture diameter of the screen 8. The fine particle size class 42 is removed and the fraction 28 (freed of the fine particle size class 42) is returned to the crystallizer 13. The particle size classifier 29 can consist, for example, of a series of two screens, or can comprise an elutriator.

At the end of the aging, the aqueous mixture 14 is collected from the crystallizer 13 and is introduced at the top of an elutriation column 15 of the levigation type. In the elutriation column 15, the aqueous mixture 14 is subjected to the action of an ascending current 16 of water, or preferably of an aqueous solution substantially saturated with sodium carbonate. The speed of the levigation current 16 is adjusted so as to fractionate the powder of the mixture into two parts 17 and 18 having two particle sizes whose cutoff diameter is smaller than the average diameter of the sodium carbonate monohydrate crystals, and at least equal to the aperture diameter of the screen 8. Advantageously, the cutoff diameter chosen is the same as in the particle size classifier 29. At the head of the elutriation column 15, a part 17 of the mixture is collected, which essentially contains fine particles whose average diameter is smaller than the cutoff diameter of the elutriation. At the foot of the column 15, the remaining part 18 of the mixture is collected, which essentially contains coarse particles whose average diameter is larger than the cutoff diameter of the elutriation. The part 18 of the mixture is sent to a centrifuge 19, from which are collected a wet sodium carbonate monohydrate powder 20 and an aqueous sodium carbonate solution 16 that is used for the levigation current in the elutriation column 15. The wet sodium carbonate monohydrate powder 20 is sent into a calcining kiln 21, in which it is heated to a temperature higher than the temperature of the transition of the sodium carbonate monohydrate into anhydrous sodium carbonate. An anhydrous sodium carbonate powder is collected from the kiln 21.

The part 17 of the mixture containing the fine particles is processed through a filter 24, from which a solid cake 25, which is removed, and an aqueous sodium carbonate solution 26, which is recycled into the crystallizer 13, are extracted separately. In a variant, activated charcoal 27 is introduced into the mixture 17, upstream from the filter 24, in order to adsorb the organic matter from the mixture into the activated carbon, which is then retained in the filter 24.

Figure 2:
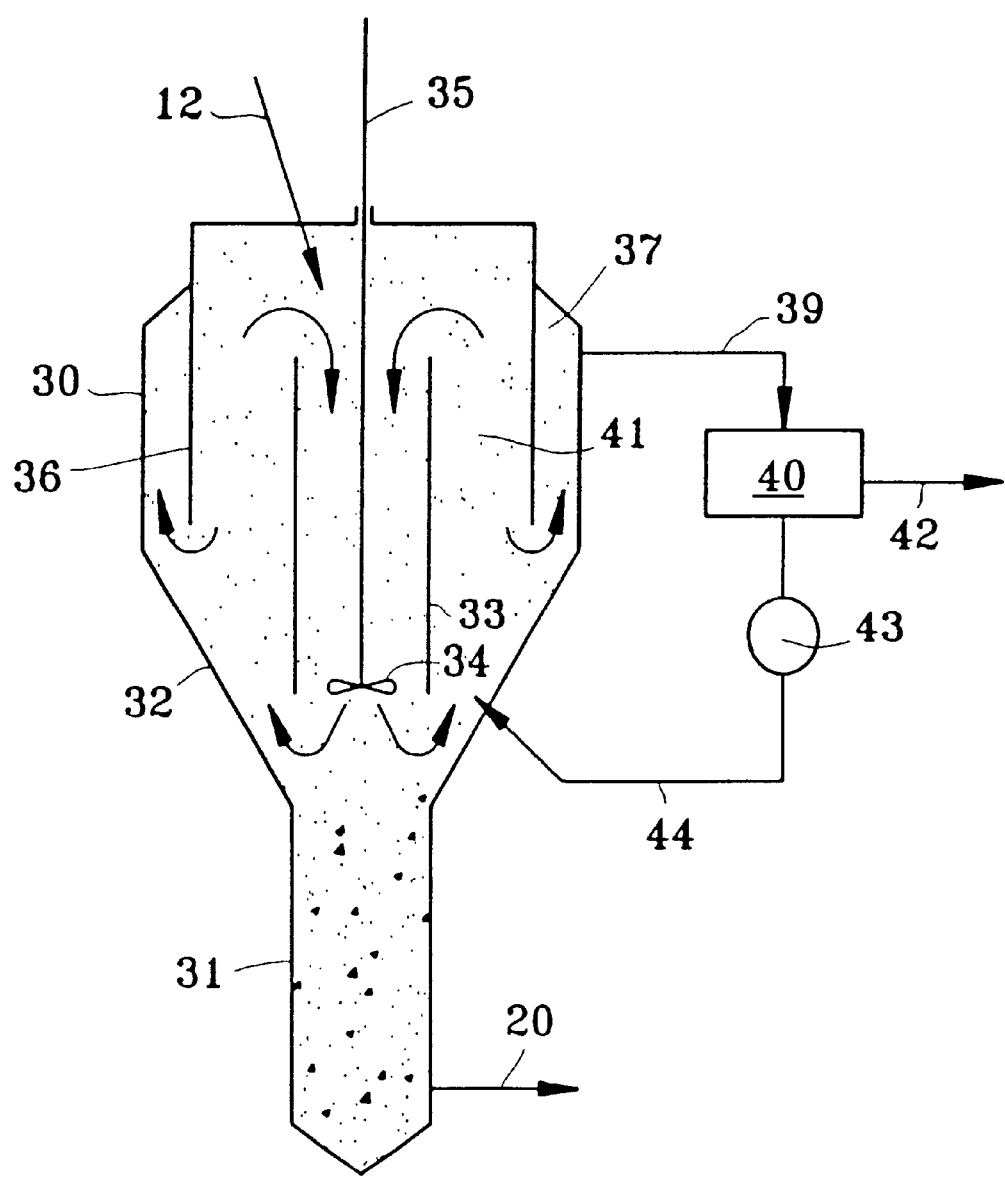
FIG. 2 shows a detail of the installation in FIG. 1.

The device represented schematically in FIG. 2 combines the crystallizer 13, the particle size classifier 29 and the elutriation column 15. This device comprises an upper vertical cylindrical area 30 and a lower vertical cylindrical area 31, connected by a truncated area 32. The three areas 30, 31 and 32 are coaxial. The enclosure contains an axial chimney 33, located in the upper area 30 and the intermediate area 32. A screw 34, located in the bottom of the chimney 33, is coupled with a motor (not represented) by means of a vertical shaft 35. A cylindrical skirt 36 delimits, in the upper area 30 of the enclosure, an annular pocket 37.

The device of FIG. 2 is intended to be interposed between the calcining kilns 11 and 21 in the installation of FIG. 1, and thus to replace the set of devices 13, 29, 15, 24 and 19 of said installation. During the operation of the device of FIG. 2, it is completely filled with an aqueous solution saturated with sodium carbonate monohydrate. This solution is subjected by the screw 34 to a coordinated movement comprising a descending translation inside the chimney 33 and an ascending translation in the annular chamber 41 formed between the chimney 33 and the skirt 36. The powdered product 12 (containing anhydrous sodium carbonate) collected from the calcining kiln 11 is introduced at the top of the device, above the chimney 33, and it is dispersed into the aqueous solution. The aqueous suspension thus formed is then subjected to the above-mentioned coordinated movement from top to bottom in the chimney 33 and from bottom to top in the annular chamber 41. During this circulation of the aqueous suspension, the anhydrous sodium carbonate it contains gradually recrystallizes into sodium carbonate monohydrate. The sodium carbonate monohydrate crystals that are formed settle in the lower area 31 of the device and are extracted from it through the conduit 20. In the peripheral annular pocket 37, the aqueous suspension is subjected to a fluidization and undergoes a particle size classification. The coarse crystals settle and the fine particles pass into the upper part of the pocket 37, where they are extracted through the conduit 39. The fraction of the aqueous suspension thus extracted from the pocket 37 through the conduit 39 is sent through a filter 40 in order to extract the solid matter 42 it contains. The solid matter 42 is removed and the filtered solution is returned to the truncated area 32 of the device by a pump 43 and a conduit 44.

In the operation of the device of FIG. 2, it is recommended that the powdered product 12 be rapidly dispersed in the aqueous solution, in order to rapidly obtain a homogenous aqueous suspension. To this end, according to an advantageous variant of utilization of the device of FIG. 2, a descending vortex is generated in the aqueous solution, in the chimney 33, and the powdered product 12 is introduced into the vortex. Certain characteristics and details relative to the design of the device and its utilization to form the vortex and introduce the powder 12 into it are available in European patent 73085 (SOLVAY, S.A.).

What is claimed is:

1. A process for producing sodium carbonate, comprising the steps of:
   successively calcining a sodium sesquicarbonate ore to form a calcined ore comprising anhydrous sodium carbonate substantially free of sodium sesquicarbonate;
   dispersing said calcined ore in an aqueous solution substantially saturated with hydrated sodium carbonate to form an aqueous suspension;
   aging said aqueous suspension to crystallize hydrated sodium carbonate having an average diameter greater than an average diameter of said calcined ore, the aging step further comprising extracting a fraction of said suspension, processing said fraction in a particle size classifier to divide a solid part of said fraction into a fine particle size class and a coarse particle size class, said fine particle size class having a particle diameter less than said average diameter of said hydrated sodium carbonate,
      discarding said fine particle size class, and
      recycling said coarse particle size class into said aqueous suspension;
   collecting an aqueous slurry of a powder comprising crystals of hydrated sodium carbonate; and
   subjecting said powder to a particle size classification.

2. A process according to claim 1, wherein said particle size fractionating comprises elutriation.

3. A process according to claim 2, wherein said aging comprises circulating said suspension in an enclosure,
   said enclosure comprising an upper vertical cylindrical area, a lower vertical cylindrical area, a chimney disposed axially in the upper area, and an annular pocket in the upper area around the chimney,
   said circulating comprising a descending translation inside the chimney and an ascending translation between the chimney and the annular pocket,
   said extracting comprising extracting said fraction in the annular pocket, and
   said processing said fraction comprises and elutriation performed in said annular pocket;
   and wherein subjecting said powder to said particle size classification comprises an elutriation performed in said lower area of the enclosure.

4. A process according to claim 1, wherein the particle size classification of the powder comprises an elutriation.

5. A process according to claim 1, wherein the hydrated sodium carbonate comprises sodium carbonate monohydrate.

6. A process according to claim 1, further comprising subjecting the ore to a physical enriching purification.

7. A process according to claim 6, wherein the physical enriching pretreatment comprises a grinding of the ore and a particle size classification.

8. The process of claim 7, wherein the ore particle size classification comprises processing the ground ore through a filter screen having apertures for filtering.

9. The process of claim 8 wherein the said fine particle size class has an average particle diameter less than a diameter of the apertures.

10. The process according to claim 6, wherein the physical pretreatment comprises a densimetric classification.

11. The process according to claim 6, wherein the physical pretreatment comprises a electrostatic classification.

12. The process according to claim 6, wherein the physical pretreatment comprises a magnetic classification.

13. A process for producing sodium carbonate, comprising the steps of:
   successively calcining the sodium sesquicarbonate ore to form a calcined ore comprising anhydrous sodium carbonate substantially free of sodium sesquicarbonate; and
   further comprising subjecting a sodium sesquicarbonate ore to a physical enriching pretreatment
      wherein the physical enriching pretreatment comprises grinding the ore and a particle size classification
         wherein the ore particle size classification comprises processing the ground ore through a filter screen having apertures for filtering
            wherein said apertures have a diameter of at least 50 $\mu$m. and at most 200 $\mu$m;
   dispersing said calcined ore in an aqueous solution substantially saturated with hydrated sodium carbonate to form an aqueous suspension;
   aging said aqueous suspension to crystallize hydrated sodium carbonate having an average diameter greater than an average diameter of said calcined ore, the aging step further comprising extracting a fraction of said suspension, processing said fraction in a particle size classifier to divide a solid part of said fraction into a fine particle size class and a coarse particle size class, said fine particle size class having a particle diameter less than said average diameter of said hydrated sodium carbonate,
      discarding said fine particle size class, and
      recycling said coarse particle size class into said aqueous suspension;
   collecting an aqueous slurry of a powder comprising crystals of hydrated sodium carbonate; and
   subjecting said powder to a particle size classification.

* * * * *